United States Patent
Miller et al.

(10) Patent No.: US 12,281,431 B2
(45) Date of Patent: Apr. 22, 2025

(54) VALVE SUPPORT BRACKET FOR TORSIONAL SUPPORT OF FLUID VALVES DURING INSTALLATION OF A ROTATIONAL FITTING

(71) Applicant: WHIRLPOOL CORPORATION, Benton Harbor, MI (US)

(72) Inventors: Edward J. Miller, Green Springs, OH (US); Dennis Asa Robinson, II, Kalamazoo, MI (US); Ravindra Balkrishna Salunkhe, Taluka Satara (IN); Ragini Dilip Patil, Jalgaon (IN)

(73) Assignee: Whirlpool Corporation, Benton Harbor, MI (US)

( * ) Notice: Subject to any disclaimer, the term of this patent is extended or adjusted under 35 U.S.C. 154(b) by 71 days.

(21) Appl. No.: 18/302,172

(22) Filed: Apr. 18, 2023

(65) Prior Publication Data
US 2024/0352649 A1 Oct. 24, 2024

(51) Int. Cl.
*D06F 39/08* (2006.01)
*D06F 39/12* (2006.01)
*F16K 27/00* (2006.01)

(52) U.S. Cl.
CPC ............ *D06F 39/088* (2013.01); *D06F 39/12* (2013.01); *F16K 27/00* (2013.01)

(58) Field of Classification Search
CPC ......... D06F 39/088; D06F 39/12; F16K 27/00
USPC .................................................. 137/343, 359
See application file for complete search history.

(56) References Cited

U.S. PATENT DOCUMENTS

| | | | |
|---|---|---|---|
| 2,832,080 A | 4/1968 | Hertenstein et al. | |
| 5,029,606 A | 7/1991 | Kuhlthau, Jr. | |
| 5,560,231 A * | 10/1996 | Hwang | D06F 39/12 68/207 |
| 5,582,199 A * | 12/1996 | Schmidt | D06F 39/08 248/68.1 |
| 8,267,109 B2 | 9/2012 | Hygema | |
| 8,789,555 B2 * | 7/2014 | Ball | E03C 1/042 137/359 |
| 2006/0226384 A1* | 10/2006 | Hygema | E03C 1/10 68/3 R |
| 2006/0254322 A1* | 11/2006 | Hygema | D06F 39/088 68/23.5 |
| 2007/0151102 A1* | 7/2007 | Hygema | D06F 39/088 68/3 R |

(Continued)

FOREIGN PATENT DOCUMENTS

| | | |
|---|---|---|
| CN | 1600255 A | 3/2005 |
| CN | 101424030 A | 5/2009 |
| CN | 209584646 U | 11/2019 |

(Continued)

*Primary Examiner* — Kelsey E Cary
(74) *Attorney, Agent, or Firm* — Price Heneveld LLP (57) ABSTRACT

A laundry appliance includes a valve assembly that includes a body and a conduit that is attached to the body. A first valve is attached to a first end of the conduit. A second valve is attached to a second end of the conduit. A valve support plate has a first aperture that receives a first fitting of the first valve, and a second aperture that receives a second fitting of the second valve. The valve support plate includes a securing interface that secures the first fitting of the first valve with the second fitting of the second valve and prevents independent rotational deflection of the first fitting and the second fitting.

20 Claims, 12 Drawing Sheets

(56) References Cited

U.S. PATENT DOCUMENTS

2014/0014211 A1* 1/2014 Ritchie, Jr. ........... D06F 39/088
  137/798
2018/0347715 A1* 12/2018 Schiesser ............ F16K 31/0672

FOREIGN PATENT DOCUMENTS

| CN | 212335577 U | 1/2021 |
| CN | 113265856 A | 8/2021 |

* cited by examiner

VALVE SUPPORT BRACKET FOR TORSIONAL SUPPORT OF FLUID VALVES DURING INSTALLATION OF A ROTATIONAL FITTING

BACKGROUND OF THE DISCLOSURE

The present disclosure generally relates to fluid valves, and more specifically, to a fluid valve assembly for use in various appliances, where the fluid valve assembly includes a valve support plate for preventing damage during over-rotation of a rotational fitting that is installed onto fluid fittings of the fluid valve assembly.

SUMMARY OF THE DISCLOSURE

According to one aspect of the present disclosure, a laundry appliance includes a valve assembly that includes a body and a conduit that is attached to the body. A first valve is attached to a first end of the conduit. A second valve is attached to a second end of the conduit. A valve support plate has a first aperture that receives a first fitting of the first valve, and a second aperture that receives a second fitting of the second valve. The valve support plate includes a securing interface that secures the first fitting of the first valve with the second fitting of the second valve and prevents independent rotational deflection of the first fitting and the second fitting.

According to another aspect of the present disclosure, a fluid assembly for an appliance includes a body, a fluid conduit that is attached to the body and has a first end and a second end, a first valve that is attached to the first end, a second valve that is attached to the second end, and a valve support plate that has a first aperture that surrounds a first fitting of the first valve and has a second aperture that surrounds a second fitting of the second valve. The valve support plate rotationally links the first fitting and the second fitting such that a rotational moment is applied to one of the first fitting and the second fitting about a rotational axis that is normal to a front surface of the valve support plate that is distributed through the valve support plate. The rotational moment is opposed by the other of the first fitting and the second fitting via the valve support plate.

According to yet another aspect of the present disclosure, a fluid assembly for an appliance includes a central body, a first valve that is attached to a first side of the central body and has a first threaded fitting that defines a first rotational axis, a second valve that is attached to a second side of the central body and has a second threaded fitting that defines a second rotational axis, and a valve support plate that has a first aperture that surrounds the first threaded fitting and a second aperture that surrounds the second threaded fitting. The valve support plate links the first threaded fitting and the second threaded fitting such that a rotational moment is applied to one of the first threaded fitting and the second threaded fitting about one of the first rotational axis and the second rotational axis, respectively, that is distributed through the valve support plate. The rotational moment is opposed by the other of the first threaded fitting and the second threaded fitting via the valve support plate.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a valve support plate installed on a valve assembly for absorbing and counteracting torque-related forces applied to a fluid valve for preventing damage to the fluid valve in the event of over-rotation of a rotationally-installed fitting. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
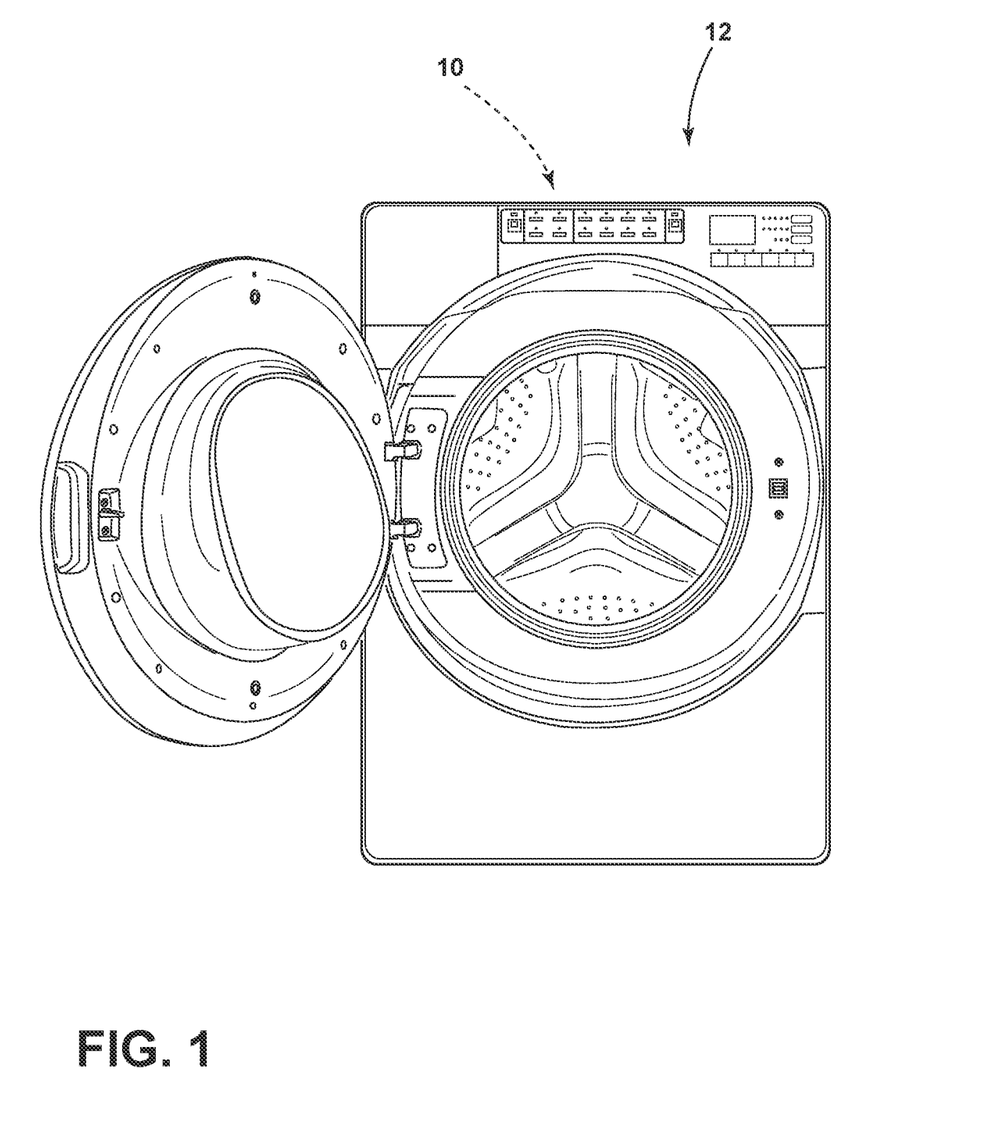
FIG. 1 is a front perspective view of a laundry appliance that incorporates a valve assembly having an aspect of the valve support plate.
Figure 2:
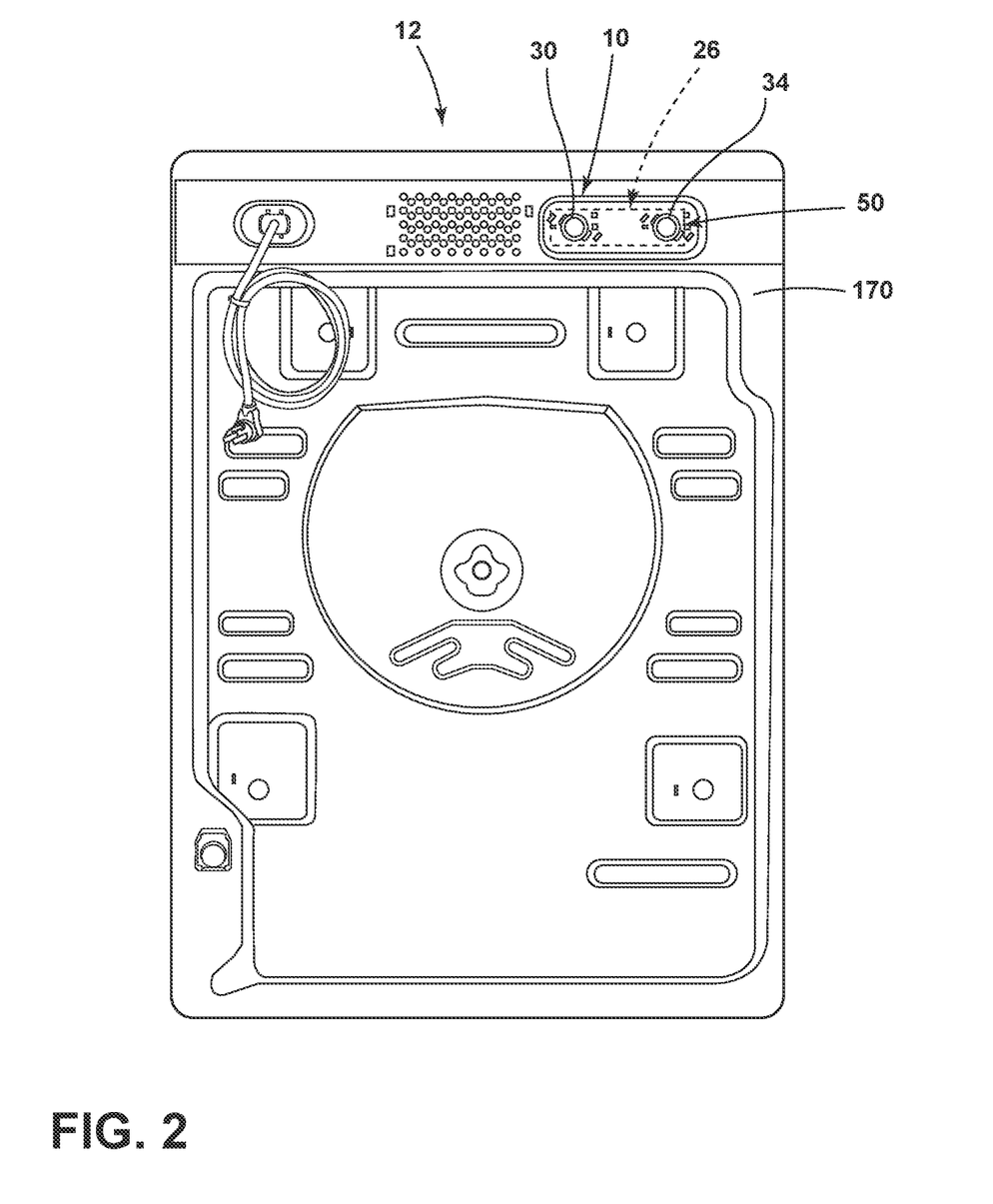
FIG. 2 is a rear perspective view of the appliance of FIG. 1.
Figure 3:
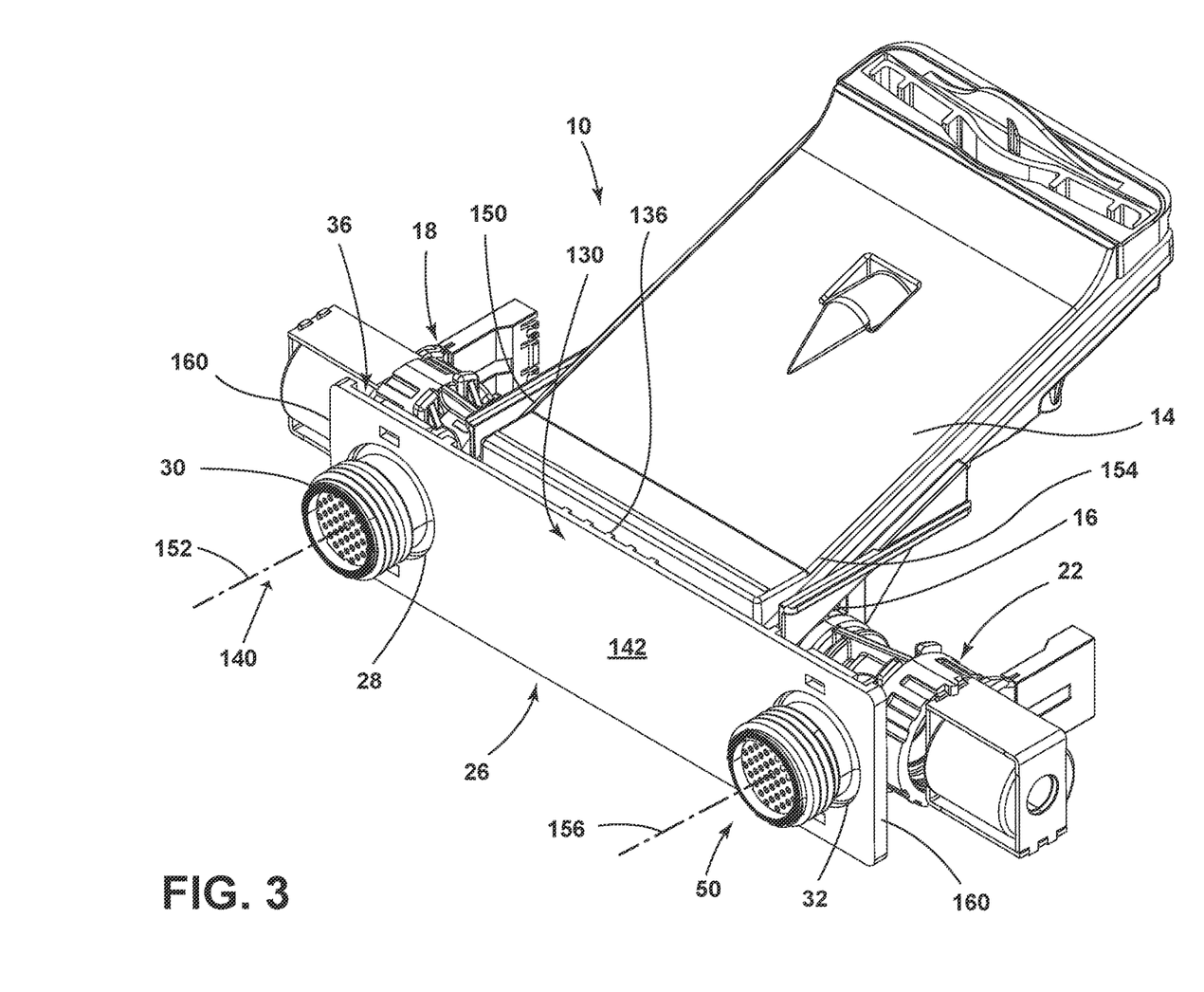
FIG. 3 is a top perspective view of a valve assembly that incorporates an aspect of the valve support plate.
Figure 4:
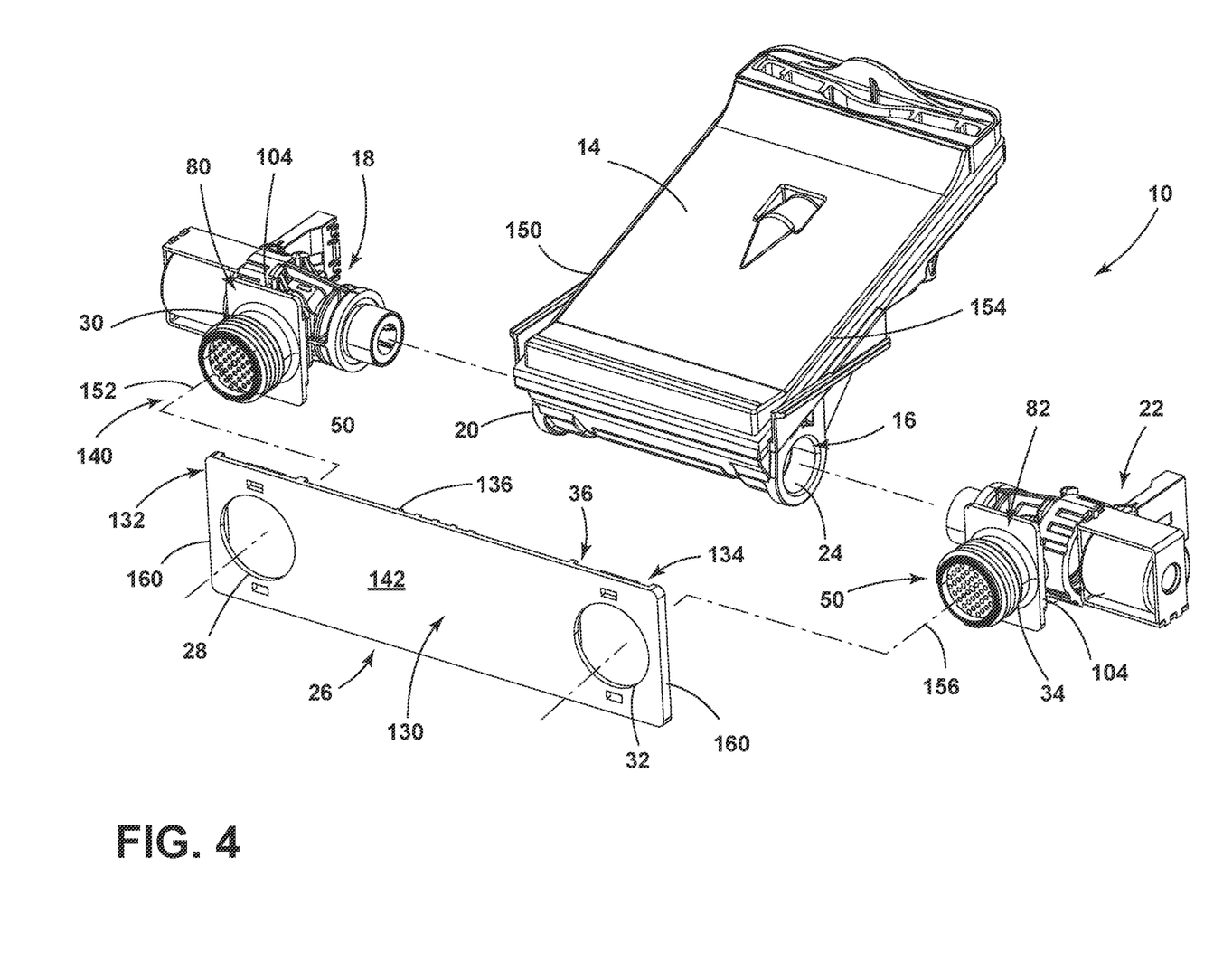
FIG. 4 is an exploded perspective view of the valve assembly of FIG. 3.
Figure 5:
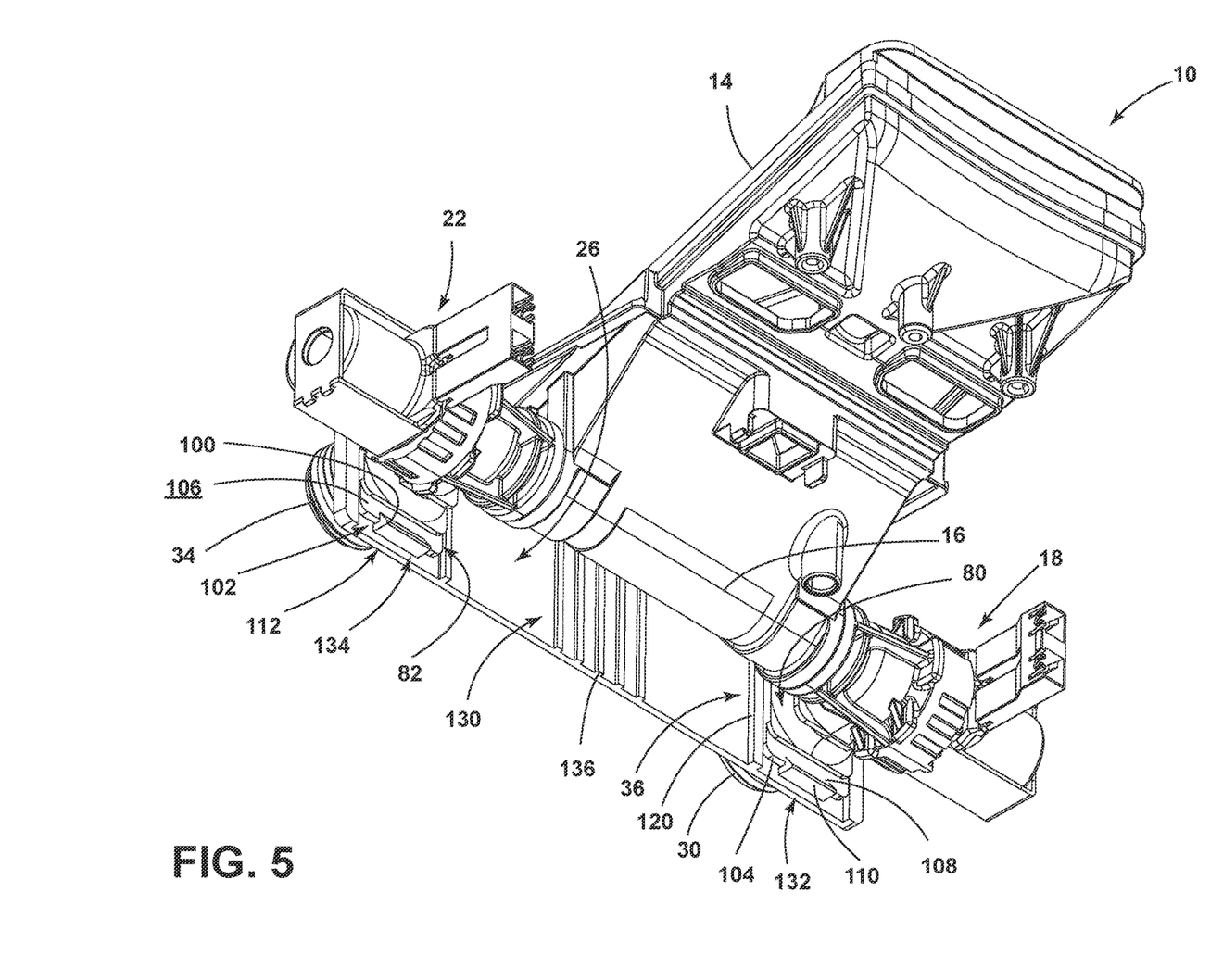
FIG. 5 is a bottom perspective view of the valve assembly of FIG. 3.
Figure 6:
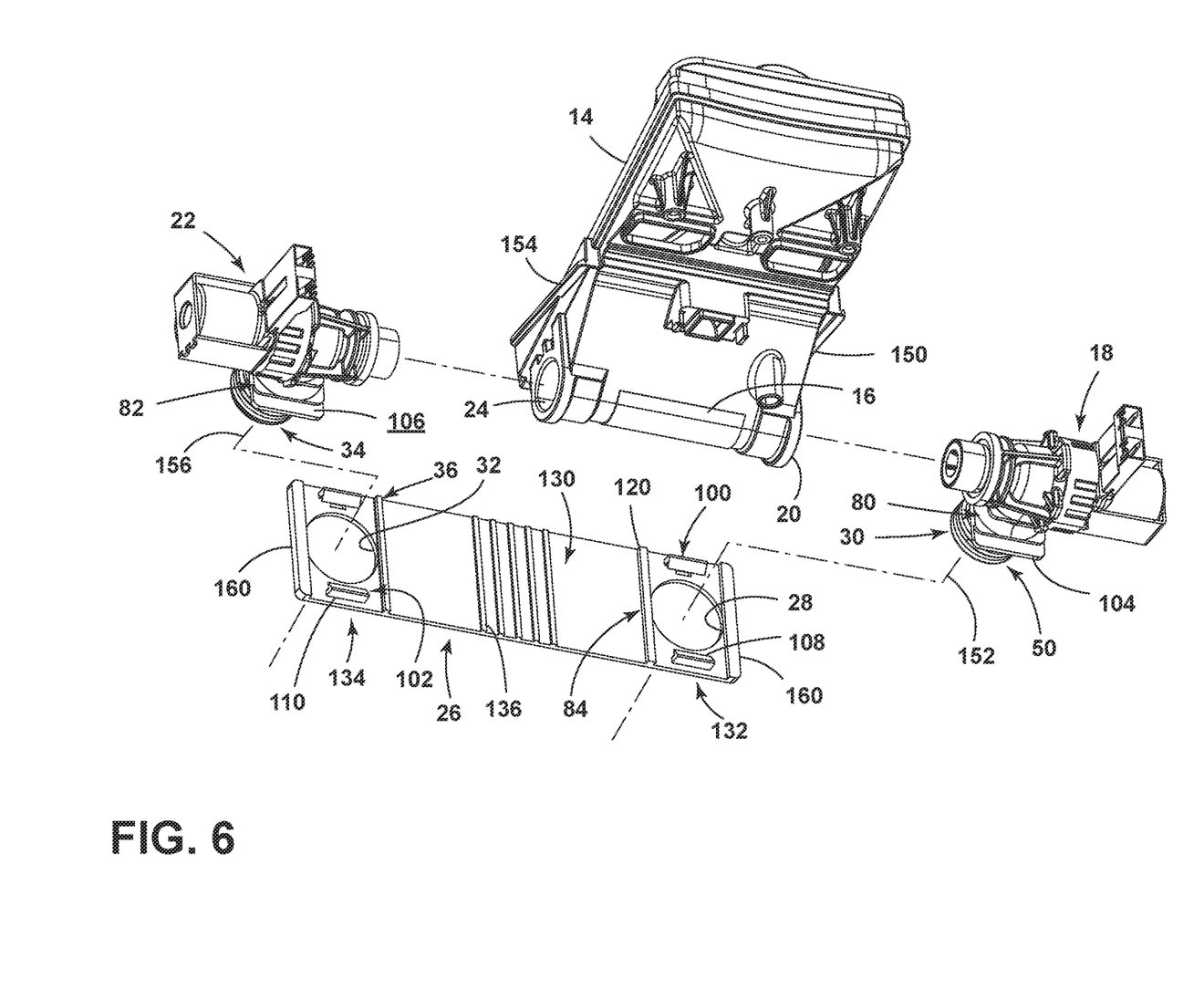
FIG. 6 is an exploded perspective view of the valve assembly of FIG. 5.
Figure 7:
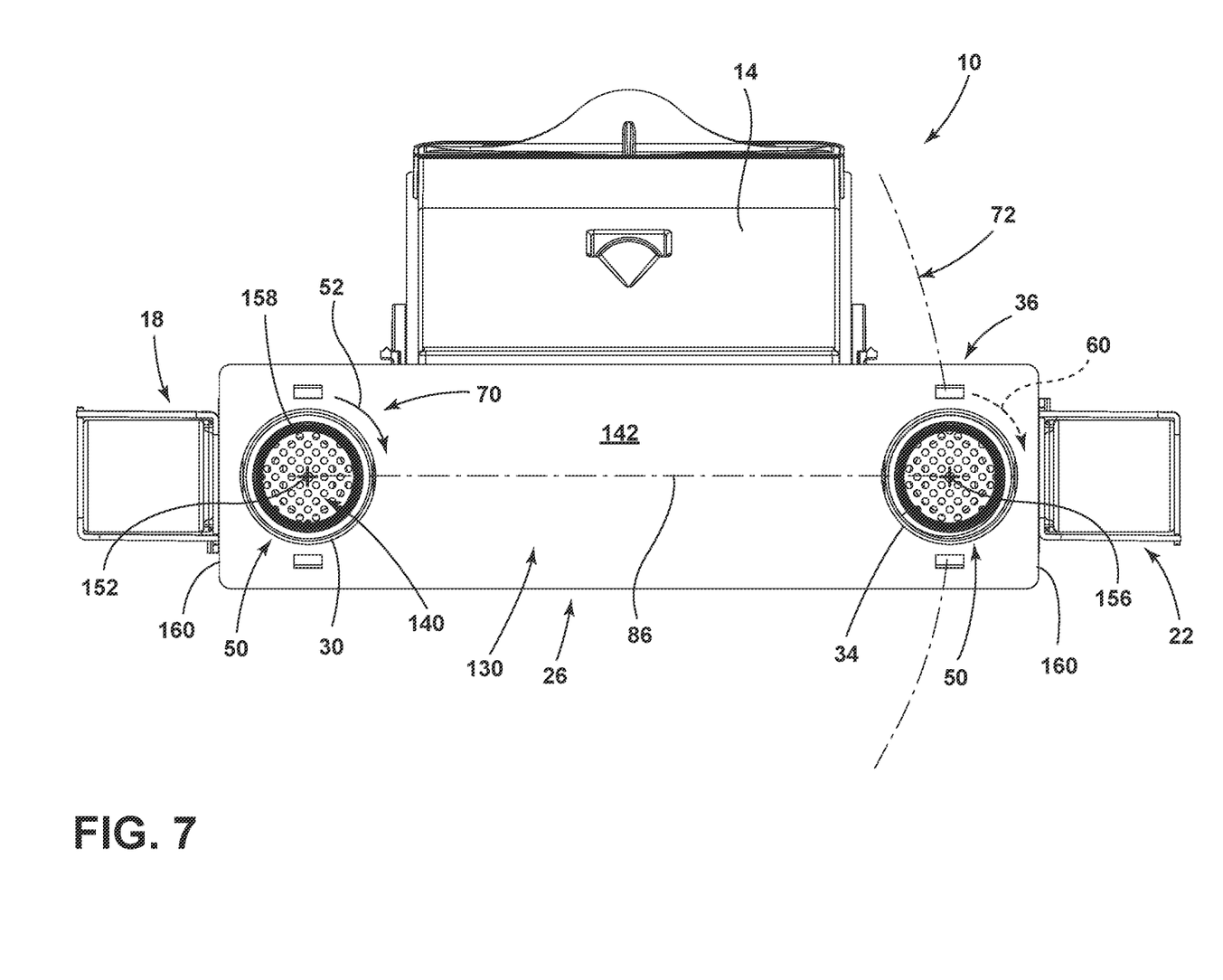
FIG. 7 is a side elevation view of the valve assembly of FIG. 3.
Figure 8:
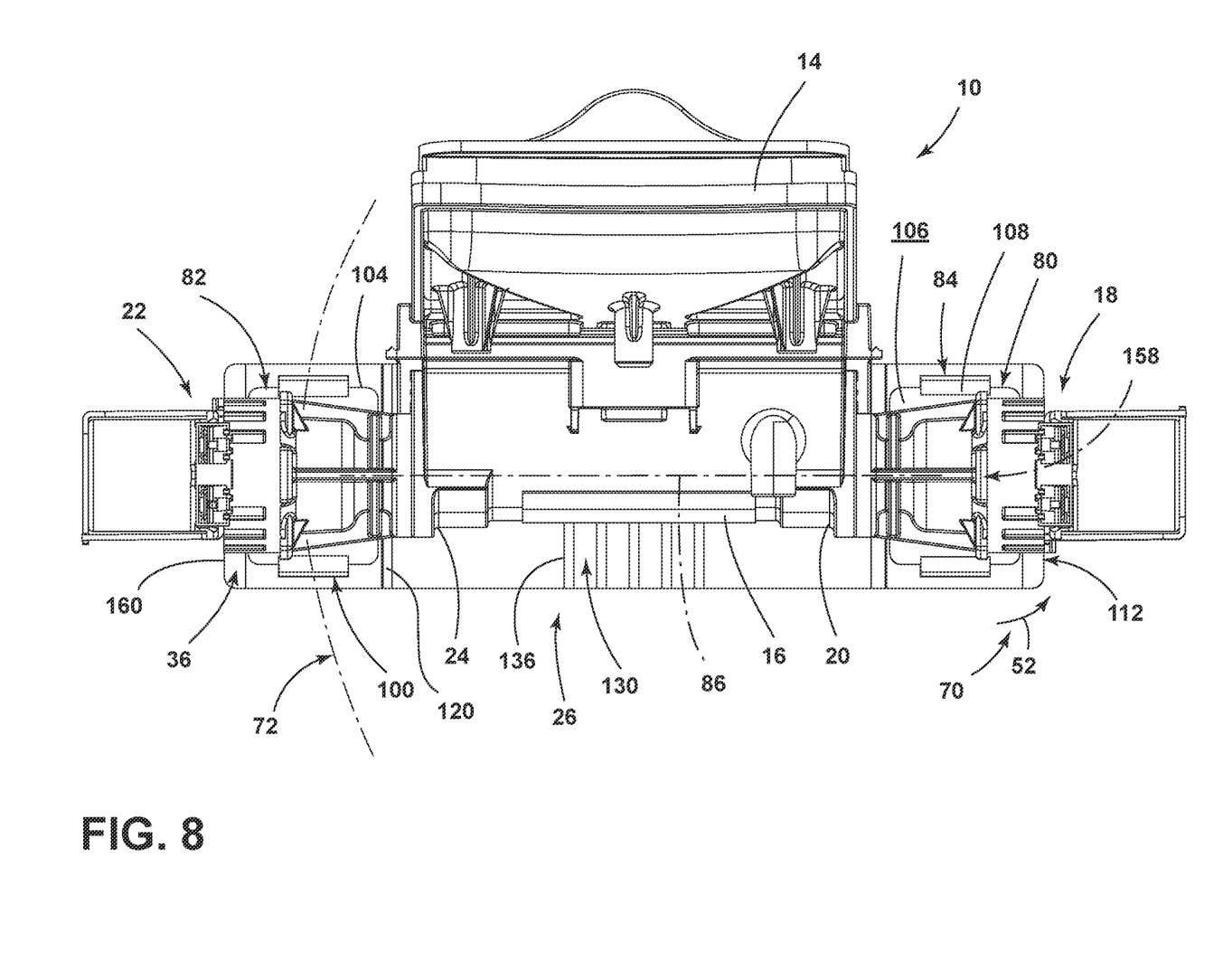
FIG. 8 is another side elevation view of the valve assembly of FIG. 3.
Figure 9:
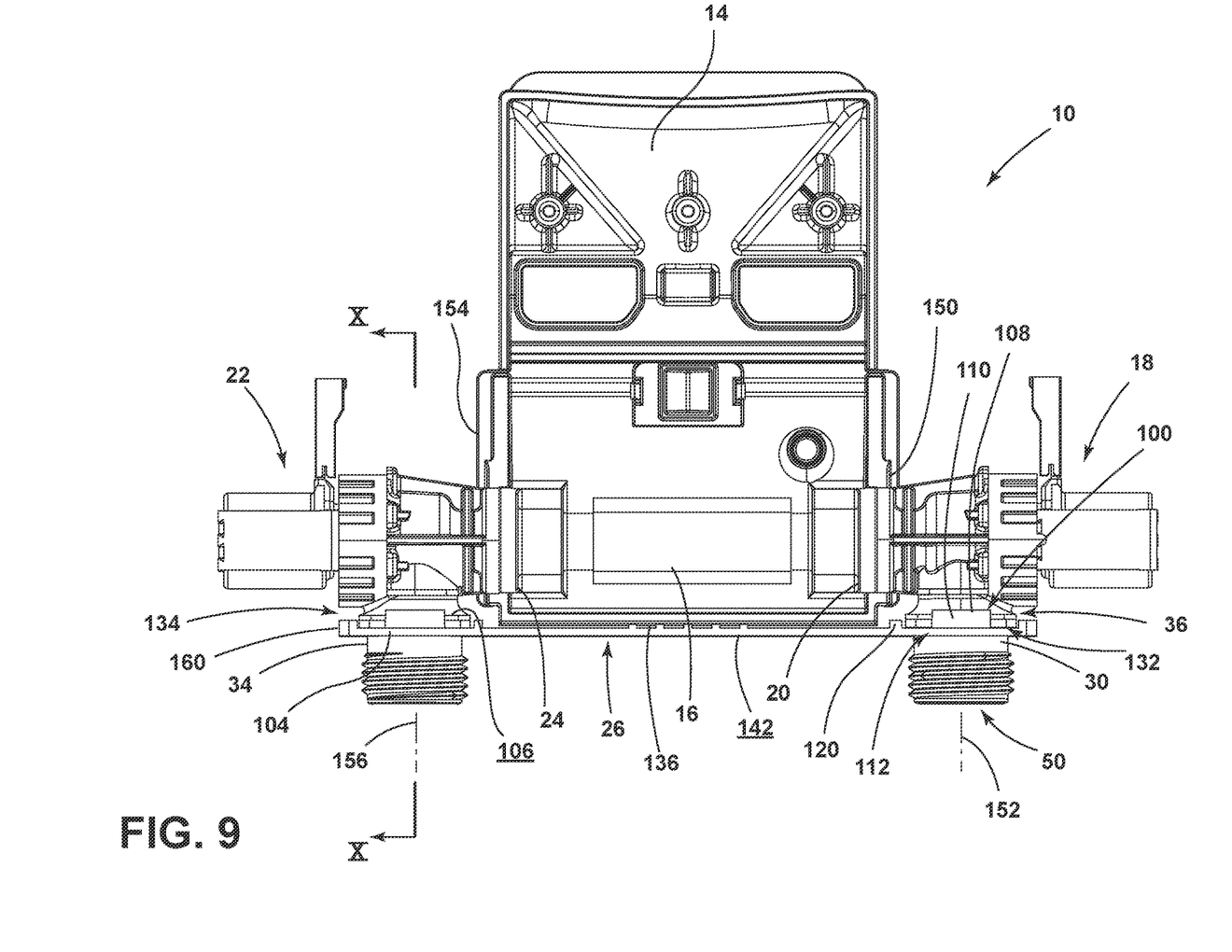
FIG. 9 is another side elevation view of the valve assembly of FIG. 3.
Figure 10:
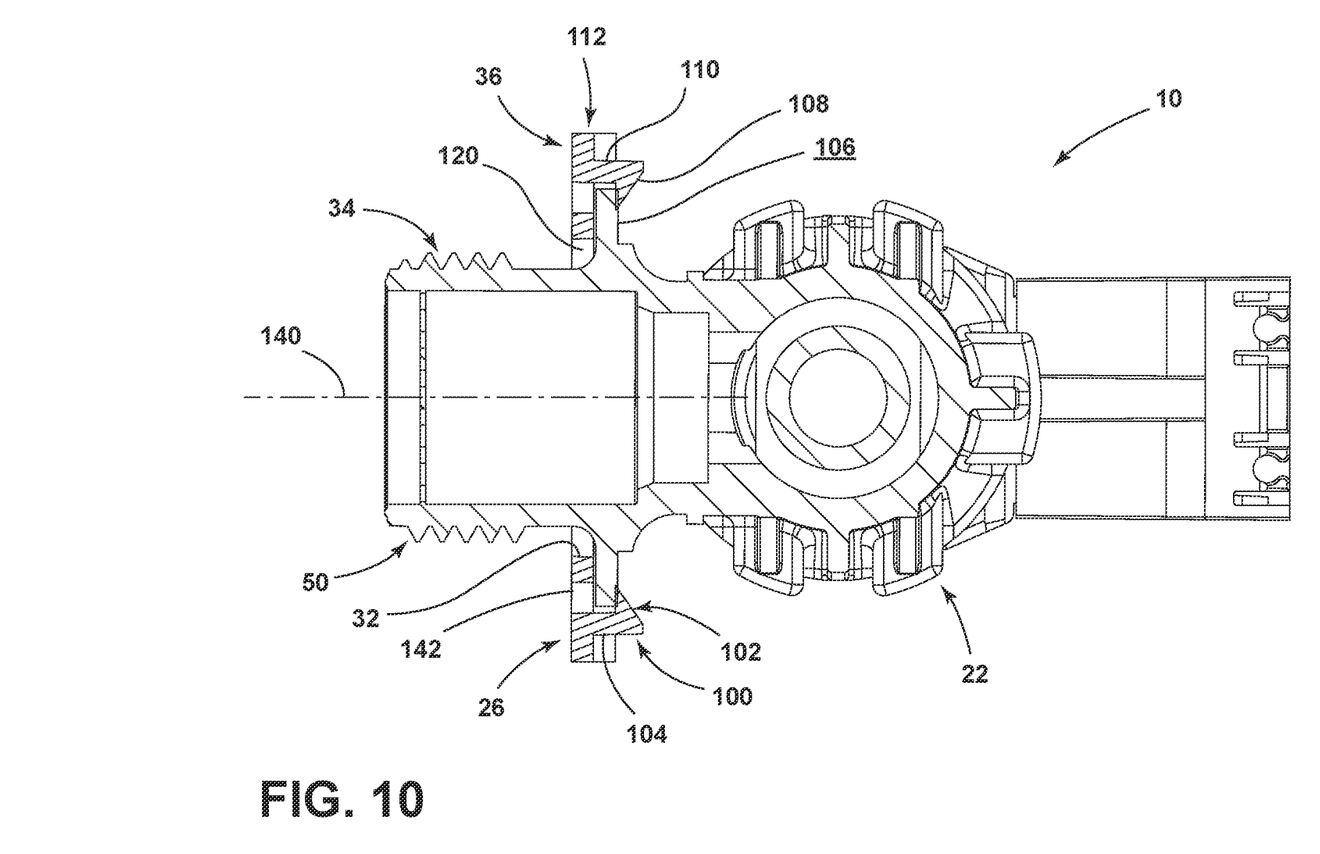
FIG. 10 is a cross-sectional view of the valve assembly of FIG. 9 taken along the line X-X.
Figure 11:
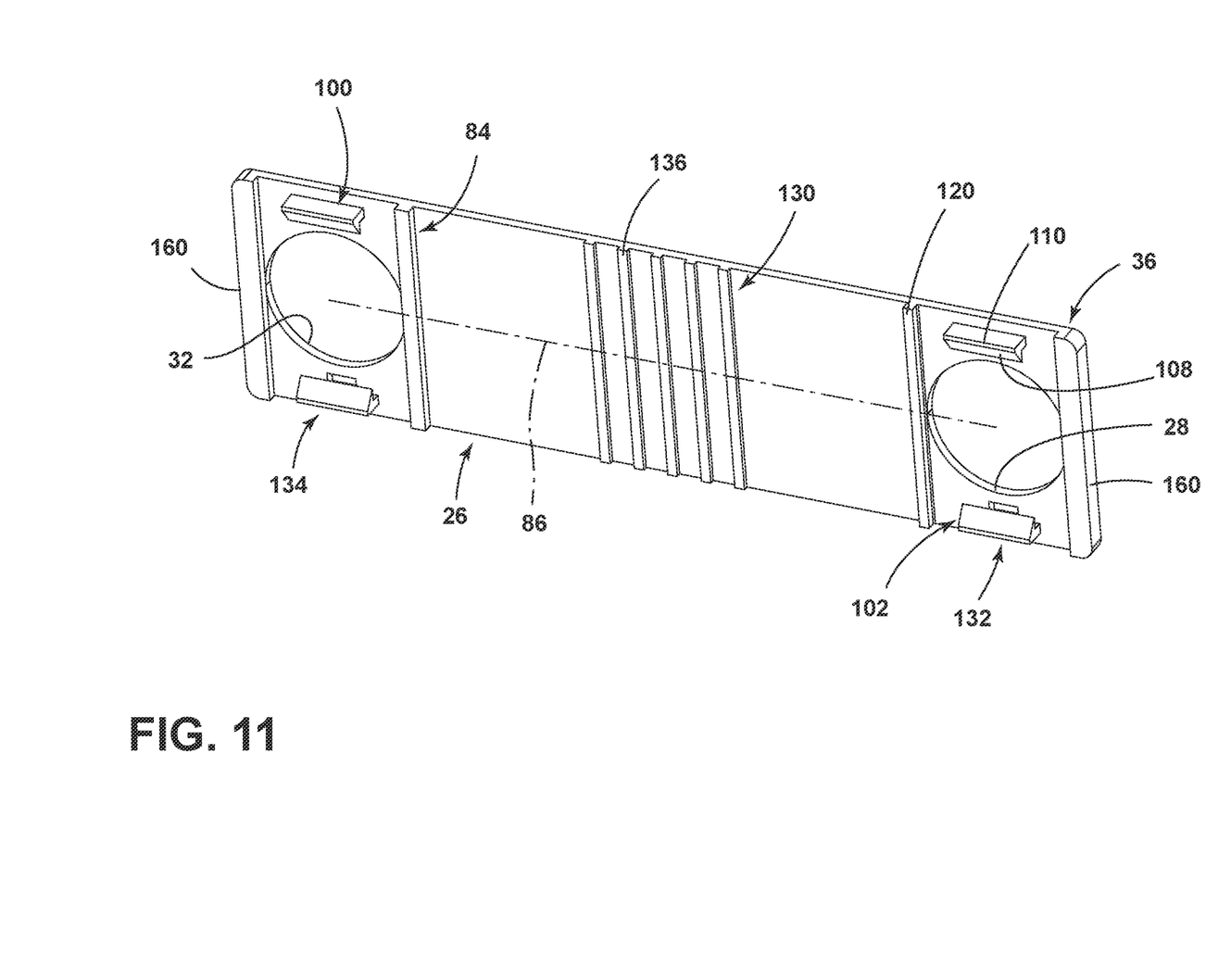
FIG. 11 is a perspective view of an aspect of the valve support plate for installation onto valves of a valve assembly.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-12, reference numeral 10 generally designates a valve assembly 10 that is incorporated within an appliance 12 for delivering fluid, typically in the form of water, from an external source and to the appliance 12 for delivery throughout various portions of the appliance 12. Typically, the valve assembly 10 is installed in a laundry-type appliance 12 that can utilize a hot water line and a cold water line for accomplishing certain washing-related functions within the appliance 12. It is contemplated that the valve assembly 10 described herein can be incorporated within any one of various appliances 12 that is connected with an external fluid source. Such appliances 12 can include, but are not limited to, laundry appliances, dishwashers, refrigerators, ovens, heating appliances, appliances for treating certain articles, and other similar appliances that utilize a fluid from an external fluid source.

Referring again to FIGS. 1-12, the appliance 12 typically in the form of a laundry-washing appliance, a laundry-drying appliance, or a combination washing and drying appliance includes a valve assembly 10 having a central body 14 and a conduit 16 that is attached to the body 14. A first valve 18 is attached to a first end 20 of the conduit 16 and a second valve 22 is attached to a second end 24 of the conduit 16. A valve support plate 26 includes a first aperture 28 that receives a first fitting 30 of the first valve 18. The valve support plate 26 also includes a second aperture 32 that receives a second fitting 34 of the second valve 22. The valve support plate 26 includes a securing interface 36 that secures the first fitting 30 of the first valve 18 with the second fitting 34 of the second valve 22. In this manner, the valve support plate 26 prevents independent rotational deflection of the first fitting 30 and the second fitting 34 with respect to one another.

Figure 12:
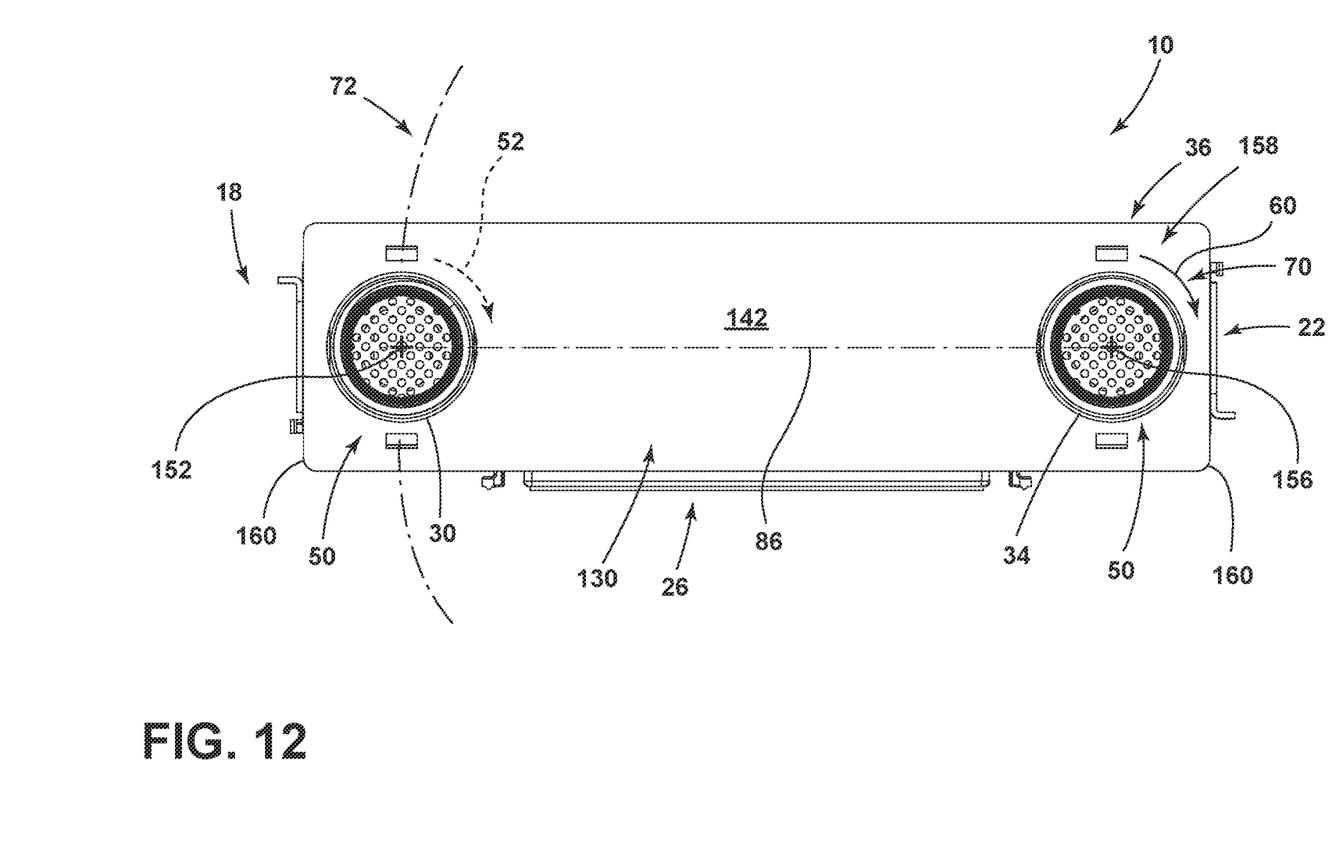
FIG. 12 is a schematic elevation view of an aspect of the valve support plate attached to a valve assembly and showing transfer of torque-related forces through the valve support plate during installation of a rotational fitting.

According to the various aspects of the device, as exemplified in FIG. 12, the first fitting 30 and the second fitting 34 typically include a threaded interface 50 that receives a threaded fitting, such as from a hot water line and a cold water line, respectively. During installation of the hot water line and the cold water line, a first rotational moment 52 or a first torque is applied to the first fitting 30 during rotation of one of the hot water line and the cold water line. This first rotational moment 52 is transferred into the first fitting 30. Through the engagement of the valve support plate 26 with the first fitting 30, this first rotational moment 52 is transferred through the valve support plate 26 and into the second fitting 34 of the second valve 22. The valve support plate 26 and the second fitting 34, in turn, operate to oppose the first rotational moment 52 that is exerted on the first fitting 30. This interaction prevents the independent rotational deflection of the first fitting 30 as a result of the first rotational moment 52. This opposition to the first rotational moment 52 is particularly useful where a hot water line or a cold water line is over-rotated onto the first fitting 30 or the second fitting 34. Such over-rotation can be caused by over-tightening as a result of tools, over-tightening as a result of hand-tightening, or other over-tightening actions in installing the hot water line and the cold water line onto the valve assembly 10.

Similar to the first fitting 30, where a second rotational moment 60 or a second torque is applied to the second fitting 34, this second rotational moment 60 is transferred through the valve support plate 26 and into the first fitting 30. As described herein, the valve support plate 26 and the first fitting 30 operate to oppose this second rotational moment 60 and prevent independent rotational deflection of the second fitting 34, during installation of the other of the hot water line and the cold water line.

This over-rotation of a rotational fitting of a hot water line and/or a cold water line can be caused by users seeking to prevent these connections from results in any leakage of water over the life of the appliance 12. By attempting to prevent this water leakage, over-tightening of these fittings can result in deflection, damage, weakening, or other similar negative result. Again, this damage can be caused by the over-tightening of rotational fittings onto the first fitting 30 or the second fitting 34. Use of the valve support plate 26, as described herein, cooperates with the other of the first and second fitting 34 to distribute these torque forces 70, resulting from over-tightening of these fittings, to be a distributed torque 72 to prevent damage to the valve assembly 10.

Referring again to FIGS. 3-12, the first fitting 30 includes a first support block 80. Similarly, the second fitting 34 includes a second support block 82. The securing interface 36 of the valve support plate 26 includes a plurality of protrusions 84 that at least partially surround the first support block 80 and the second support block 82. Through this interaction of the securing interface 36 with the first support block 80 and the second support block 82, the first fitting 30 is secured relative to the second fitting 34, and the second fitting 34 is secured relative to the first fitting 30. In this manner, the valve support plate 26 operates as a force-resisting moment arm 86 that opposes or counteracts the first rotational moment 52 and the second rotational moment 60.

Described in another way, where an over-tightening torque force 70 is applied to one of the threaded interfaces 50 of the first and second fittings 30, 34, this over-tightening torque force 70 is transferred through the moment arm 86 of the valve support plate 26 and is transferred into the valve assembly as a distributed torque 72. Again the moment arm 86 distributes and diminishes the effect of the torque force 70 as a distributed torque 72. The valve support plate 26, in turn, utilizes the other of the first and second fittings 30, 34 to maintain the rotational position of the valve support plate 26 and the first fitting 30 and the second fitting 34. Accordingly, these components operate in combination to counteract or oppose the over-tightening torque force 70 that is applied to the threaded interface 50. Accordingly, while the over-tightening torque force 70 may be damaging to the threaded interface 50, the moment arm 86 formed by the valve support plate 26 allows the other of the first and second fittings 30, 34 to experience only a minimal rotational force resulting from the use of the moment arm 86 of the valve support plate 26. This moment arm 86 produces a mechanical advantage that distributes the over-tightening torque force 70, such that only a minimal effective force, the distributed torque 72, is exerted on any portion of the valve assembly 10. In this manner, little to no damage is experienced by the valve assembly 10 as a result of the over-rotation of the threaded fitting.

Referring again to FIGS. 3-11, the plurality of protrusions 84 of the securing interface 36 for the valve support plate 26 includes attachment protrusions 100 that extend from the valve support plate 26 and engage the first support block 80 and the second support block 82, respectively. These attachment protrusions 100 include a hook-type profile 102 that extends around an outer edge 104 of each of the first support block 80 and the second support block 82 and engage an opposing surface 106 of each of the first support block 80 and the second support block 82, respectively. Each of these attachment protrusions 100 can include an angled leading edge 108 that can be used as a deflecting feature to allow for installation of the valve support plate 26 over the first support block 80 and the second support block 82. Additionally, each of the attachment protrusions 100 can include a resilient arm 110 that can deflect outward during installation of the valve support plate 26 onto the first support block 80 and the second support block 82. Accordingly, during installation of the valve support plate 26, the resilient arm 110 of the various attachment protrusions 100 can deflect outward as the attachment protrusions 100 move around the outer edges 104 of the first support block 80 and the second support block 82 and can deflect into a securing position 112 when the valve support plate 26 is installed onto the valve assembly 10.

Referring again to FIGS. 3-12, the plurality of protrusions 84 of the securing interface 36 also include blocking protrusions 120 that engage outer edges 104 of the first support block 80 and the second support block 82, respectively. The attachment protrusions 100 and the blocking protrusions 120 of the securing interface 36 operate to secure the valve support plate 26 onto first support block 80 and the second support block 82. In this manner, the plurality of protrusions 84 serve to align the valve support plate 26 relative to the first fitting 30 and the second fitting 34. The plurality of protrusions 84 also secure the valve support plate 26, including the first aperture 28 and the second aperture 32, with respect to the first fitting 30 and the second fitting 34. Accordingly, the valve support plate 26 is securely positioned relative to the first fitting 30 and the second fitting 34 such that the first rotational moment 52 and the second rotational moment 60 can be properly counteracted, opposed, and absorbed, as described herein.

Referring again to FIGS. 3-12, the valve support plate 26 includes a medial section 130 that extends between the first aperture 28 and the second aperture 32. This medial section 130 also extends between the first set of protrusions 132 that surround the first aperture 28 and the second set of protrusions 134 that surround the second aperture 32. This medial section 130 also includes a plurality of ribs 136 that serve to reinforce the valve support plate 26. The plurality of ribs 136 act as a reinforcing structure that prevents deflection of the medial section 130 and the remainder of the moment arm 86 formed by the valve support plate 26 that is used to oppose the over-tightening torque forces 70 that are exerted upon the first fitting 30 and the second fitting 34. These ribs 136 can be oriented in any one of various directions that operate to counteract deflection of the valve support plate 26.

Referring again to FIGS. 3-12, the valve assembly 10 is installed within the appliance 12. This valve assembly 10 includes the central body 14 and a fluid conduit 16 that is attached to the central body 14, where the fluid conduit 16 includes a first end 20 and a second end 24. A first valve 18 is attached to the first end 20 and a second valve 22 is attached to the second end 24. A valve support plate 26 includes a first aperture 28 that surrounds a first fitting 30 of the first valve 18. The valve support plate 26 also includes a second aperture 32 that surrounds a second fitting 34 of the second valve 22. The valve support plate 26 rotationally links the first fitting 30 and the second fitting 34. Through this rotational linkage, a rotational moment or torque force 70 that is applied to one of the first fitting 30 and the second fitting 34 about a rotational axis 140 that is normal to a front surface 142 of the valve support plate 26 is diluted, as the distributed torque 72, through the valve support plate 26. The rotational moment or torque force 70 is thereby opposed by the other of the first fitting 30 and the second fitting 34 in cooperation with the valve support plate 26. In this manner, the valve support plate 26 acts as a moment arm 86 that transfers the rotational torque force 70 from the source of the moment (typically the threaded interface 50), through the valve support plate 26. The torque force 70 is distributed to the end of the moment arm 86 where the torque force 70 is converted to the distributed torque 72 and minimized through the mechanical advantage gained by the moment arm 86 of the valve support plate 26. Accordingly, damage that may result from the rotational torque force 70 is minimized through the use of the moment arm 86 and distributing the rotational torque force 70 to the end of the moment arm 86 opposite the source 158 of the rotational torque force 70.

Referring again to FIGS. 3-10, the first fitting 30 and the second fitting 34 are typically threaded-type fittings having a threaded interface 50. The rotational moment or torque force 70 described herein is generated through the threaded interface 50 with one of the first fitting 30 and the second fitting 34. The first fitting 30 and the second fitting 34 are typically used to receive a hot water line and a cold water line, or two fluid lines that deliver fluids into the appliance 12, via the valve assembly 10.

According to the various aspects of the device, the valve support plate 26 is utilized to extend between the first fitting 30 and the second fitting 34, where each of the first and second fittings 30, 34 receive a separate fluid line from an exterior source of fluid. It is contemplated that the valve support plate 26 can also be installed on a valve assembly 10 having a single threaded fitting. In such an aspect of the device, the valve support plate 26 can surround and engage the single fitting. The moment arm 86 created by the valve support plate 26 can extend to a section of the valve assembly 10 such that the moment arm 86 distributes any torque forces 70 through the valve support plate 26 and into the body 14 of the valve assembly 10 as the distributed torque 72. Accordingly, the valve assembly 10 that receives the valve support plate 26 can include a single fitting or, as described herein, can include a first fitting 30 and a second fitting 34. It should be understood that additional fittings can be installed on the valve assembly 10, according to the design of the appliance 12 and the valve assembly 10.

Referring again to FIGS. 1-12, the fluid assembly for the appliance 12 includes a body 14, typically in the form of a central body 14. A first valve 18 is attached to a first side 150 of the central body 14 and includes a first threaded fitting 30 that defines a first rotational axis 152. A second valve 22 is attached to a second side 154 of the central body 14 and includes a second threaded fitting that defines a second rotational axis 156. The valve support plate 26 includes the first aperture 28 that surrounds the first threaded fitting 30. The valve support plate 26 also includes the second aperture 32 that surrounds the second threaded fitting 34. The valve support plate 26 links the first threaded fitting 30 and the second threaded fitting 34. In this manner, a rotational moment or rotational torque applied to one of the first threaded fitting 30 and the second threaded fitting 34 about one of the first rotational axis 152 and the second rotational axis 156, respectively, is distributed through the valve support plate 26. Accordingly, this rotational torque force 70 is opposed by the other of the first threaded fitting 30 and the second threaded fitting 34 via the valve support plate 26. As described herein, through this interaction between the first threaded fitting 30, the second threaded fitting 34, and the valve support plate 26, the valve support plate 26 acts as a moment arm 86 that distributes the rotational torque force 70 from the source of the rotational moment, to the opposing end 160 of the moment arm 86. This operates to achieve a mechanical advantage that counteracts or opposes this rotational torque force 70 as the distributed torque 72. In turn, use of the moment arm 86 minimizes deflection or other damage to either the first threaded fitting 30 or the second threaded fitting 34, as well as other components of the valve assembly 10.

According to the various aspects of the device, the valve support plate 26 can be made of any one of various materials that include, but are not limited to, plastic, metal, composite, combinations thereof, and other generally rigid-type materials. It is contemplated that the valve support plate 26 can be installed onto the valve assembly 10 for installation into the appliance 12. In such an aspect of the device, it is contemplated that the valve assembly 10 having the valve support plate 26 is installed within the appliance 12 and then a cover member 170 is applied to the rear of the appliance 12 to conceal various mechanical features of the appliance 12, including the valve assembly 10 and the valve support plate 26.

In certain aspects of the device, it is contemplated that the valve support plate 26 can be defined by an after-market component that can be installed onto a valve assembly 10 of a previously-purchased appliance 12. Accordingly, the valve support plate 26 can include various model-specific protrusions 84 that can interact with and engage various features of the after-market valve assembly 10 for the appliance 12.

It is contemplated that the valve support plate 26 defines a moment arm 86 that distributes a particular torque force 70 from a rotational axis 140 or source 158 of this torque force 70, through the moment arm 86, and to the opposing end 160 of the moment arm 86. Through this configuration, the first fitting 30 and the second fitting 34, in cooperation with the valve support plate 26, support one another to prevent damage to the first fitting 30 and the second fitting 34 in the event of over-rotation or over-tightening of a threaded interface 50 with the first fitting 30 and the second fitting 34. The various protrusions 84 that define the securing interface 36 of the valve support plate 26 interact with the first support block 80 and the second support block 82 to fixedly secure the valve support plate 26 with respect to the first fitting 30 and the second fitting 34. Accordingly, the valve support plate 26 operates to prevent any deflection, or substantially prevent any deflection, with respect to a torque-related force applied to the first fitting 30 or the second fitting 34. It should be understood that substantial deflection of the first fitting 30 or the second fitting 34 can be defined as a deflection of greater than approximately 1 degree of rotational movement of the first fitting 30, the second fitting 34, and the valve support plate 26. Accordingly, the valve support plate 26 is designed to prevent deflection of this magnitude in an over-tightening condition.

The invention disclosed herein is further summarized in the following paragraphs and is further characterized by combinations of any and all of the various aspects described therein.

According to one aspect of the present disclosure, a laundry appliance includes a valve assembly that includes a body and a conduit that is attached to the body. A first valve is attached to a first end of the conduit. A second valve is attached to a second end of the conduit. A valve support plate has a first aperture that receives a first fitting of the first valve, and a second aperture that receives a second fitting of the second valve. The valve support plate includes a securing interface that secures the first fitting of the first valve with the second fitting of the second valve and prevents independent rotational deflection of the first fitting and the second fitting.

According to another aspect, a first rotational moment applied to the first fitting is transferred through the valve support plate and into the second fitting. The valve support plate and the second fitting operate to oppose the first rotational moment and prevent the independent rotational deflection of the first fitting.

According to another aspect, a second rotational moment applied to the second fitting is transferred through the valve support plate and into the first fitting. The valve support plate and the first fitting operate to oppose the second rotational moment and prevent the independent rotational deflection of the second fitting.

According to another aspect, the first fitting includes a first support block and the second fitting includes a second support block. The securing interface of the valve support plate includes a plurality of protrusions that at least partially surround the first support block and the second support block to secure the first fitting relative to the second fitting and to secure the second fitting relative to the first fitting.

According to another aspect, the plurality of protrusions include attachment protrusions that extend from the valve support plate and engage an opposing surface of the first support block and the second support block, respectively.

According to another aspect, the plurality of protrusions include blocking protrusions that engage outer edges of the first support block and the second support block, respectively.

According to another aspect, the valve support plate includes a medial section between the first aperture and the second aperture. The medial section includes a reinforcing structure.

According to another aspect, the reinforcing structure includes a plurality of ribs.

According to another aspect of the present disclosure, a fluid assembly for an appliance includes a body, a fluid conduit that is attached to the body and has a first end and a second end, a first valve that is attached to the first end, a second valve that is attached to the second end, and a valve support plate that has a first aperture that surrounds a first fitting of the first valve and has a second aperture that surrounds a second fitting of the second valve. The valve support plate rotationally links the first fitting and the second fitting such that a rotational moment is applied to one of the first fitting and the second fitting about a rotational axis that is normal to a front surface of the valve support plate that is distributed through the valve support plate. The rotational moment is opposed by the other of the first fitting and the second fitting via the valve support plate.

According to another aspect, the first fitting includes a first support block and the second fitting includes a second support block. A securing interface of the valve support plate includes a plurality of protrusions that at least partially surround the first support block and the second support block to secure the first fitting relative to the second fitting and to secure the second fitting relative to the first fitting.

According to another aspect, the plurality of protrusions include attachment protrusions that extend from the valve support plate and engage an opposing surface of the first support block and the second support block, respectively.

According to another aspect, the plurality of protrusions include blocking protrusions that engage outer edges of the first support block and the second support block, respectively.

According to another aspect, the valve support plate includes a medial section between the first aperture and the second aperture. The medial section includes a reinforcing structure.

According to another aspect, the reinforcing structure includes a plurality of ribs.

According to another aspect, the first fitting and the second fitting are threaded-type fittings. The rotational moment is generated through a threaded interface with one of the first fitting and the second fitting.

According to yet another aspect of the present disclosure, a fluid assembly for an appliance includes a central body, a first valve that is attached to a first side of the central body and has a first threaded fitting that defines a first rotational axis, a second valve that is attached to a second side of the central body and has a second threaded fitting that defines a second rotational axis, and a valve support plate that has a first aperture that surrounds the first threaded fitting and a second aperture that surrounds the second threaded fitting. The valve support plate links the first threaded fitting and the second threaded fitting such that a rotational moment is applied to one of the first threaded fitting and the second threaded fitting about one of the first rotational axis and the second rotational axis, respectively, that is distributed through the valve support plate. The rotational moment is opposed by the other of the first threaded fitting and the second threaded fitting via the valve support plate.

According to another aspect, the first threaded fitting includes a first support block and the second threaded fitting includes a second support block. A securing interface of the valve support plate includes a plurality of protrusions that at least partially surround the first support block and the second support block to secure the first threaded fitting relative to the second threaded fitting and to secure the second threaded fitting relative to the first threaded fitting.

According to another aspect, the plurality of protrusions include attachment protrusions that extend from the valve support plate and engage an opposing surface of the first support block and the second support block, respectively. The plurality of protrusions include blocking protrusions that engage outer edges of the first support block and the second support block, respectively.

According to another aspect, the valve support plate includes a medial section between the first aperture and the second aperture. The medial section includes a plurality of reinforcing ribs.

According to another aspect, the first threaded fitting and the second threaded fitting are threaded-type fittings. The rotational moment is generated through a threaded interface with one of the first threaded fitting and the second threaded fitting.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:
   a valve assembly that includes a body and a conduit that is attached to the body;
   a first valve attached to a first end of the conduit;
   a second valve attached to a second end of the conduit; and
   a valve support plate having a first aperture that receives a first fitting of the first valve and a second aperture that receives a second fitting of the second valve, wherein the valve support plate includes a securing interface that secures the first fitting of the first valve with the second fitting of the second valve and prevents independent rotational deflection of the first fitting and the second fitting, wherein the first fitting includes a first support block and the second fitting includes a second support block, and wherein the securing interface of the valve support plate includes a plurality of protrusions that at least partially surround the first support block and the second support block to secure the first fitting relative to the second fitting and to secure the second fitting relative to the first fitting.

2. The laundry appliance of claim 1, wherein a first rotational moment applied to the first fitting is transferred through the valve support plate and into the second fitting, wherein the valve support plate and the second fitting operate to oppose the first rotational moment and prevent the independent rotational deflection of the first fitting.

3. The laundry appliance of claim 2, wherein a second rotational moment applied to the second fitting is transferred through the valve support plate and into the first fitting, wherein the valve support plate and the first fitting operate to oppose the second rotational moment and prevent the independent rotational deflection of the second fitting.

4. The laundry appliance of claim 3, wherein the first fitting and the second fitting are threaded-type fittings, and wherein the first rotational moment and the second rotational moment are generated through a threaded interface with one of the first fitting and the second fitting, respectively.

5. The laundry appliance of claim 1, wherein the plurality of protrusions include attachment protrusions that extend from the valve support plate and engage an opposing surface of the first support block and the second support block, respectively.

6. The laundry appliance of claim 5, wherein the plurality of protrusions include blocking protrusions that engage outer edges of the first support block and the second support block, respectively.

7. The laundry appliance of claim 1, wherein the valve support plate includes a medial section between the first aperture and the second aperture, wherein the medial section includes a reinforcing structure.

8. The laundry appliance of claim 7, wherein the reinforcing structure includes a plurality of ribs.

9. A fluid assembly for an appliance, the fluid assembly comprising:
   a body;
   a fluid conduit attached to the body and having a first end and a second end;
   a first valve attached to the first end;
   a second valve attached to the second end; and
   a valve support plate having a first aperture that surrounds a first fitting of the first valve and having a second aperture that surrounds a second fitting of the second valve, wherein the valve support plate rotationally links the first fitting and the second fitting such that a rotational moment applied to one of the first fitting and the second fitting about a rotational axis that is normal to a front surface of the valve support plate is distributed through the valve support plate, and wherein the rotational moment is opposed by the other of the first fitting and the second fitting via the valve support plate, wherein the first fitting includes a first support block and the second fitting includes a second support block, and wherein a securing interface of the valve support plate includes a plurality of protrusions that at least partially surround the first support block and the second support block to secure the first fitting relative to the second fitting and to secure the second fitting relative to the first fitting.

10. The fluid assembly of claim 9, wherein the plurality of protrusions include attachment protrusions that extend from the valve support plate and engage an opposing surface of the first support block and the second support block, respectively.

11. The fluid assembly of claim 10, wherein the attachment protrusions each include a hook-type profile that extends around an outer edge of the valve support plate to engage the opposing surfaces of the first support block and the second support block, respectively.

12. The fluid assembly of claim 9, wherein the plurality of protrusions include blocking protrusions that engage outer edges of the first support block and the second support block, respectively.

13. The fluid assembly of claim 9, wherein the valve support plate includes a medial section between the first aperture and the second aperture, wherein the medial section includes a reinforcing structure.

14. The fluid assembly of claim 13, wherein the reinforcing structure includes a plurality of ribs.

15. The fluid assembly of claim 9, wherein the first fitting and the second fitting are threaded-type fittings, and wherein the rotational moment is generated through a threaded interface with one of the first fitting and the second fitting.

16. A fluid assembly for an appliance, the fluid assembly comprising:
   a central body;
   a first valve attached to a first side of the central body and having a first threaded fitting that defines a first rotational axis;
   a second valve attached to a second side of the central body and having a second threaded fitting that defines a second rotational axis; and
   a valve support plate having a first aperture that surrounds the first threaded fitting and having a second aperture that surrounds the second threaded fitting, wherein the valve support plate links the first threaded fitting and the second threaded fitting such that a rotational moment applied to one of the first threaded fitting and the second threaded fitting about one of the first rotational axis and the second rotational axis, respectively, is distributed through the valve support plate, and wherein the rotational moment is opposed by the other of the first threaded fitting and the second threaded fitting via the valve support plate, wherein the first threaded fitting includes a first support block and the second threaded fitting includes a second support block, and wherein a securing interface of the valve support plate includes a plurality of protrusions that at least partially surround the first support block and the second support block to secure the first threaded fitting relative to the second threaded fitting and to secure the second threaded fitting relative to the first threaded fitting.

17. The fluid assembly of claim 16, wherein the plurality of protrusions include attachment protrusions that extend from the valve support plate and engage an opposing surface of the first support block and the second support block, respectively, and wherein the plurality of protrusions include blocking protrusions that engage outer edges of the first support block and the second support block, respectively.

18. The fluid assembly of claim 17, wherein the attachment protrusions each include a resilient arm having a hook-type profile.

19. The fluid assembly of claim 16, wherein the valve support plate includes a medial section between the first aperture and the second aperture, wherein the medial section includes a plurality of reinforcing ribs.

20. The fluid assembly of claim 17, wherein the first threaded fitting and the second threaded fitting are threaded-type fittings, and wherein the rotational moment is generated through a threaded interface with one of the first threaded fitting and the second threaded fitting.

\* \* \* \* \*